(12) United States Patent
Jensen et al.

(10) Patent No.: US 9,389,132 B1
(45) Date of Patent: *Jul. 12, 2016

(54) METHODS AND SYSTEMS FOR ESTIMATING AN ORIENTATION OF A TETHERED AERIAL VEHICLE RELATIVE TO WIND

(71) Applicant: Google Inc., Mountain View, CA (US)

(72) Inventors: Kenny Jensen, Berkeley, CA (US); Damon Vander Lind, Alameda, CA (US)

(73) Assignee: Google Inc., Mountain View, CA (US)

(*) Notice: Subject to any disclaimer, the term of this patent is extended or adjusted under 35 U.S.C. 154(b) by 69 days.

This patent is subject to a terminal disclaimer.

(21) Appl. No.: 14/141,193

(22) Filed: Dec. 26, 2013

(51) Int. Cl.
*G01L 1/22* (2006.01)
*G01L 5/16* (2006.01)

(52) U.S. Cl.
CPC .......................................... *G01L 5/16* (2013.01)

(58) Field of Classification Search
CPC ..... F03D 11/00; F05B 2240/921; G01L 5/16; G01L 1/22
USPC .................................. 244/155 A; 73/862.045
See application file for complete search history.

(56) References Cited

U.S. PATENT DOCUMENTS

| | | | |
|---|---|---|---|
| 5,564,656 A | 10/1996 | Gilbert | |
| 8,157,205 B2 | 4/2012 | McWhirk | |
| 8,247,912 B2 | 8/2012 | Da Costa Duarte Pardal et al. | |
| 8,707,796 B2 | 4/2014 | Duenas et al. | |
| 2010/0032948 A1 | 2/2010 | Bevirt | |
| 2010/0282153 A1 | 11/2010 | Wrage et al. | |
| 2010/0295303 A1 | 11/2010 | Lind et al. | |
| 2011/0180667 A1 | 7/2011 | O'Brien et al. | |
| 2011/0260462 A1 | 10/2011 | Vander Lind | |
| 2011/0266809 A1 | 11/2011 | Calverley | |
| 2012/0104763 A1 | 5/2012 | Lind | |

OTHER PUBLICATIONS

E.J. Terink, J. Breukels, R. Schmehl, W. J. Ockels, "Flight dynamics and stability of a tethered inflatable kite plane," AIAA Journal of Aircraft, 2011, pp. 503-513, vol. 48, No. 2.
Hobbs, S., "A Quantitative study of kite performance in natural wind with application to kite anemometry," PhD Thesis, Cranfield University, Cranfield, United Kingdom, 1986.

*Primary Examiner* — Lisa Caputo
*Assistant Examiner* — Roger Hernandez-Prewit
(74) *Attorney, Agent, or Firm* — McDonnell Boehnen Hulbert & Berghoff LLP

(57) ABSTRACT

A system may include a tether coupled to a ground station. The system may also include an aerial vehicle coupled to the tether and configured to fly in a given path relative to the ground station based on a length of the tether. The system may also include one or more load cells coupled to the tether and configured to provide information indicative of a tether force between the tether and the aerial vehicle. The one or more load cells may be arranged in a given arrangement indicative of a direction of the tether force. The system may also include a controller configured to determine an angle between a direction of wind incident on the aerial vehicle and a plane defined by a longitudinal axis and a lateral axis of the aerial vehicle based on the tether force.

20 Claims, 6 Drawing Sheets

METHODS AND SYSTEMS FOR ESTIMATING AN ORIENTATION OF A TETHERED AERIAL VEHICLE RELATIVE TO WIND

BACKGROUND

Unless otherwise indicated herein, the materials described in this section are not prior art to the claims in this application and are not admitted to be prior art by inclusion in this section.

Tethered aerial vehicles, such as kites, may be configured to fly based on air flow from wind over and under the tethered aerial vehicle's wing and tension in a tether coupled to the aerial vehicle. In one example, a wind energy system may be coupled to the aerial vehicle to convert kinetic wind energy to electrical energy.

SUMMARY

In one example, a system is provided that comprises a tether coupled to a ground station. The system further comprises an aerial vehicle coupled to the tether and configured to fly in a given path relative to the ground station based on a length of the tether. The system further comprises one or more load cells coupled to the tether and configured to provide information indicative of a tether force between the tether and the aerial vehicle. The one or more load cells may be arranged in a given arrangement indicative of a direction of the tether force. The system further comprises a controller configured to determine an angle between a direction of wind incident on the aerial vehicle and a plane defined by a longitudinal axis of the aerial vehicle and a lateral axis of the aerial vehicle based on the tether force indicated by the information from the one or more load cells.

In another example, a method is provided that comprises receiving, by a controller, information from one or more load cells. The one or more load cells may be coupled to a tether which couples a ground station to an aerial vehicle. The aerial vehicle may be configured to fly in a given path relative to the ground station based on a length of the tether. The method further comprises determining a tether force between the tether and the aerial vehicle by the controller based on the information. The one or more load cells may be arranged in a given arrangement indicative of a direction of the tether force. The method further comprises determining, by the controller, an angle between a direction of wind incident on the aerial vehicle and a plane defined by a longitudinal axis of the aerial vehicle and a lateral axis of the aerial vehicle based on the tether force indicated by the information from the one or more load cells.

In yet another example, a non-transitory computer readable medium is provided. The non-transitory computer readable medium may have instructions stored therein that when executed by a computing device cause the computing device to perform functions. The functions comprise receiving information from one or more load cells. The one or more load cells may be coupled to a tether which couples a ground station to an aerial vehicle. The aerial vehicle may be configured to fly in a given path relative to the ground station based on a length of the tether. The functions further comprise determining a tether force between the tether and the aerial vehicle based on the information. The one or more load cells may be arranged in a given arrangement indicative of a direction of the tether force. The functions further comprise determining an angle between a direction of wind incident on the aerial vehicle and a plane defined by a longitudinal axis of the aerial vehicle and a lateral axis of the aerial vehicle based on the tether force indicated by the information from the one or more load cells.

In still another example, a system is provided comprising a means for receiving information from one or more load cells. The one or more load cells may be coupled to a tether which couples a ground station to an aerial vehicle. The aerial vehicle may be configured to fly in a given path relative to the ground station based on a length of the tether. The system also comprises a means for determining a tether force between the tether and the aerial vehicle based on the information. The one or more load cells may be arranged in a given arrangement indicative of a direction of the tether force. The system also comprises a means for determining an angle between a direction of wind incident on the aerial vehicle and a plane defined by a longitudinal axis of the aerial vehicle and a lateral axis of the aerial vehicle based on the tether force indicated by the information from the one or more load cells.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Illustrative embodiments relate to aerial vehicles coupled, via a tether, to a ground station and configured to fly in a given path relative to the ground station based on a length of the tether. In some examples, the aerial vehicles may be used in a wind energy system, such as an Airborne Wind Turbine (AWT). Within examples, illustrative embodiments may relate to methods and systems for measuring angles between a direction of wind incident on the aerial vehicle during flight and various axes of the aerial vehicle. The angles measured may correspond to aerodynamic parameters utilized to control the aerial vehicle, for example, by causing actuation of control surfaces (e.g., flaps, tail, wings, rotors, etc.). In another example, the aerial vehicle may be controlled to regulate the angles to optimize efficiency of the AWT (e.g., regulate lift). In some examples, angles measured in the disclosed methods and systems may be referred to in aerodynamics terms as "angle-of-attack" (alpha) and/or "sideslip angle" (beta).

Figure 1:
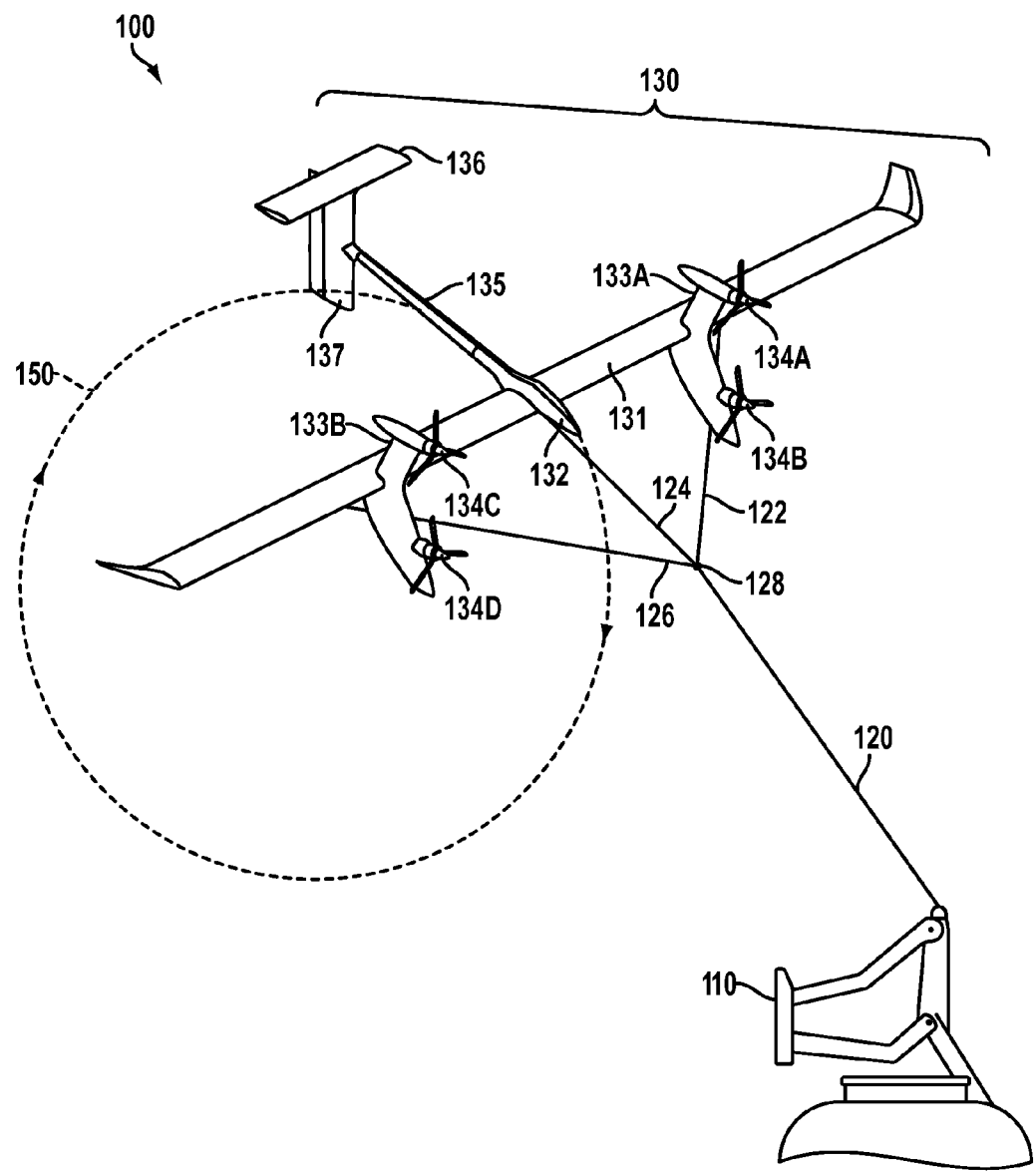
FIG. 1 illustrates an example system that includes a tethered aerial vehicle, in accordance with at least some embodiments described herein.

Referring now to the figures, FIG. 1 illustrates an example system 100 that includes a tethered aerial vehicle 130, in accordance with at least some embodiments described herein. The system 100 includes a ground station 110, a tether 120, bridles 122-126, and the aerial vehicle 130. As illustrated in FIG. 1, the aerial vehicle 130 may be coupled to the tether 120 via the bridles 122-126, and the tether 120 may be coupled to the ground station 110.

In some examples, the ground station 110 may be utilized to hold and/or support the aerial vehicle 130 when the aerial vehicle 130 is not in flight. Additionally, for example, the ground station 110 may be configured to allow for the repositioning of the aerial vehicle 130 and/or the deployment of the aerial vehicle 130 to flight. Further, in some examples, the ground station 110 may be configured to receive the aerial vehicle 130 during landing. The ground station 110 may be formed of any material that can suitably support the aerial vehicle 130 and/or anchor the aerial vehicle 130 to the ground station 110 via the tether 120 during flight of the aerial vehicle 130.

Additionally, in some examples, the ground station 110 may include one or more components (not shown in FIG. 1), such as a winch, that may vary a length of the tether 120. For example, when the aerial vehicle 130 is deployed, the one or more components may be configured to reel out and/or reel in the tether 120 to a given length.

In some examples, the tether 120 may be configured to transport electrical energy between the aerial vehicle 130 and the ground station 110. For example, the aerial vehicle 130 may include an Airborne Wind Turbine (AWT) and the tether 120 may be configured to transmit the electrical energy provided by the AWT to the ground station 110. In another example, the tether 120 may be configured to transmit electrical energy to the aerial vehicle 130 to power the aerial vehicle 130 for takeoff, landing, and/or flight. The tether 120 may comprise various materials (e.g., copper, gold, aluminum, etc.) that allow transmission, delivery, and/or harnessing of electrical energy generated by the aerial vehicle 130 and/or transmission of electricity to the aerial vehicle 130 from the ground station 110. In some examples, the tether 120 may also be configured to withstand one or more forces of the aerial vehicle 130 when the aerial vehicle 130 is in flight. For example, the tether 120 may include a core configured to withstand one or more forces (e.g., tether force, gravity, etc.) on the tether 120 during flight of the aerial vehicle 130. The core, for example, may be constructed from any high-strength fibers. In some examples, the tether 120 may have a fixed length and/or a variable length.

In some examples, the tether 120 may also be configured as a communication medium between the ground station 110 and the aerial vehicle 130. For example, the tether 120 may include electrical wiring for transmission of control signals from the ground station 110 and/or receipt of sensor measurements from the aerial vehicle 130.

The bridles 122-126 may be formed similarly to the tether 120 and configured to support electrical transmission between the aerial vehicle 130 and the ground station 110 as described above for the tether 120. In some examples, the bridles 122-126 may be attached to the tether 120 at attachment point 128. Although illustrated in FIG. 1 that the bridles 122-126 are three bridles, in some examples, the system 100 may include more or less bridles. In some examples, the aerial vehicle 130 may be attached directly to the tether 120 without the bridles 122-126 or the attachment point 128. In some examples, the bridles 122-126 may be coupled to the aerial vehicle 130 in a co-linear arrangement (e.g., along a given line). For example, as illustrated in FIG. 1, the bridles 122-126 may be coupled to the aerial vehicle 130 along a pitch axis of the aerial vehicle 130. Although not illustrated in FIG. 1, in some examples, the bridles 122-126 may be coupled to the aerial vehicle 130 in a non-linear arrangement. For example, the bridle 124 may be alternatively coupled along tail boom 135 such that the bridles 122-126 are not coupled to the aerial vehicle 130 along the given line.

The aerial vehicle 130 may be configured to fly along a path 150 relative to the ground station 110 based on the length of the tether 120. The aerial vehicle 130 may comprise various aerodynamic devices such as a kite, a helicopter, a wing, an airplane, etc. The aerial vehicle 130 may be formed of solid materials such as metal, plastic, and/or other polymers. In some examples, the materials utilized to form the aerial vehicle 130 may include lightning hardened and/or design fault-tolerant materials capable of withstanding sudden shifts in wind speed and wind direction or other environmental events.

The path 150 (e.g., "given path") may have various shapes in various embodiments of the system 100. For example, as illustrated in FIG. 1, the path 150 may be substantially circular. Although not illustrated in FIG. 1, in some examples, other shapes of the path 150 may be possible such as oval, ellipse, jelly bean, shape of the number 8, etc. In some examples, the aerial vehicle 130 may be configured to fly along the path 150 relative to the ground station 110 based on the length of the tether 120. For example, the shape of the path 150 and/or distance of the path 150 from the ground station 110 may be defined by the length of the tether 120.

As illustrated in FIG. 1, the aerial vehicle 130 may include a main wing 131, a front section 132, pylons 133A-B, rotors 134A-D, a tail boom 135, a tail wing 136, and a vertical stabilizer 137. Any of these components may be shaped in any form which allows for the use of components of lift to resist gravity and/or move the aerial vehicle 130 during flight.

The main wing 131 may be configured to provide lift for the aerial vehicle 130. In some examples, the main wing 131 may be formed from one or more rigid or flexible airfoils, and may include various control surfaces, such as winglets, flaps, rudders, elevators, etc. For example, the control surfaces may be used to stabilize the aerial vehicle 130 and/or reduce drag on the aerial vehicle 130 during flight.

The main wing 131 may be formed from any suitable material for the aerial vehicle 130 to engage in flight. For example, the main wing 131 may include carbon fiber and/or e-glass. Moreover, the main wing 131 may have a variety of dimensions. In one example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The pylons 133A-B may connect the rotors 134A-D to the main wing 131. As illustrated in FIG. 1, in some examples, the pylons 133A-B may be arranged such that the rotors 134A-D are spaced in a given arrangement relative to the main wing 131. In some examples, a vertical spacing between corresponding rotors (e.g., rotor 134A and rotor 134B or rotor 134C and rotor 134D) may be 0.9 meters.

In some examples, the rotors 134A-D may be configured to drive one or more generators for the purpose of generating electrical energy. In these examples, the rotors 134A-D may each include one or more blades, such as three blades as illustrated in FIG. 1. The one or more rotor blades may rotate via interactions with wind incident on the aerial vehicle (e.g., "relative wind") and could be used to drive the one or more generators. Additionally or alternatively, in some examples, the rotors 134A-D may also be configured to provide thrust to the aerial vehicle 130 during flight. For example, the rotors 134A-D may function as one or more propulsion units, such as a propeller. Although the rotors 134A-D are depicted as four rotors in FIG. 1, in some examples, the aerial vehicle 130 may include any number of rotors, such as less than four rotors or more than four rotors.

The tail boom 135 may be configured to connect the main wing 131 to the tail wing 136. The tail boom 135 may have a variety of dimensions. For example, the tail boom 135 may have a length of 2 meters. Moreover, in some examples, the tail boom 135 could take the form of a body and/or fuselage of the aerial vehicle 130. For example, the tail boom 135 may carry a payload.

The tail wing 136 and/or the vertical stabilizer 137 may be used to stabilize the aerial vehicle 130 and/or reduce drag on the aerial vehicle 130 during flight. For example, the tail wing 136 and/or the vertical stabilizer 137 may be used to control a pitch or roll of the aerial vehicle 130 during flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120. Additionally, it is noted that example dimensions described above, such as dimensions of the aerial vehicle 130 and the tether 120 are for illustrative purposes only. In some examples, components of the system 100 may have other dimensions.

Figure 2:
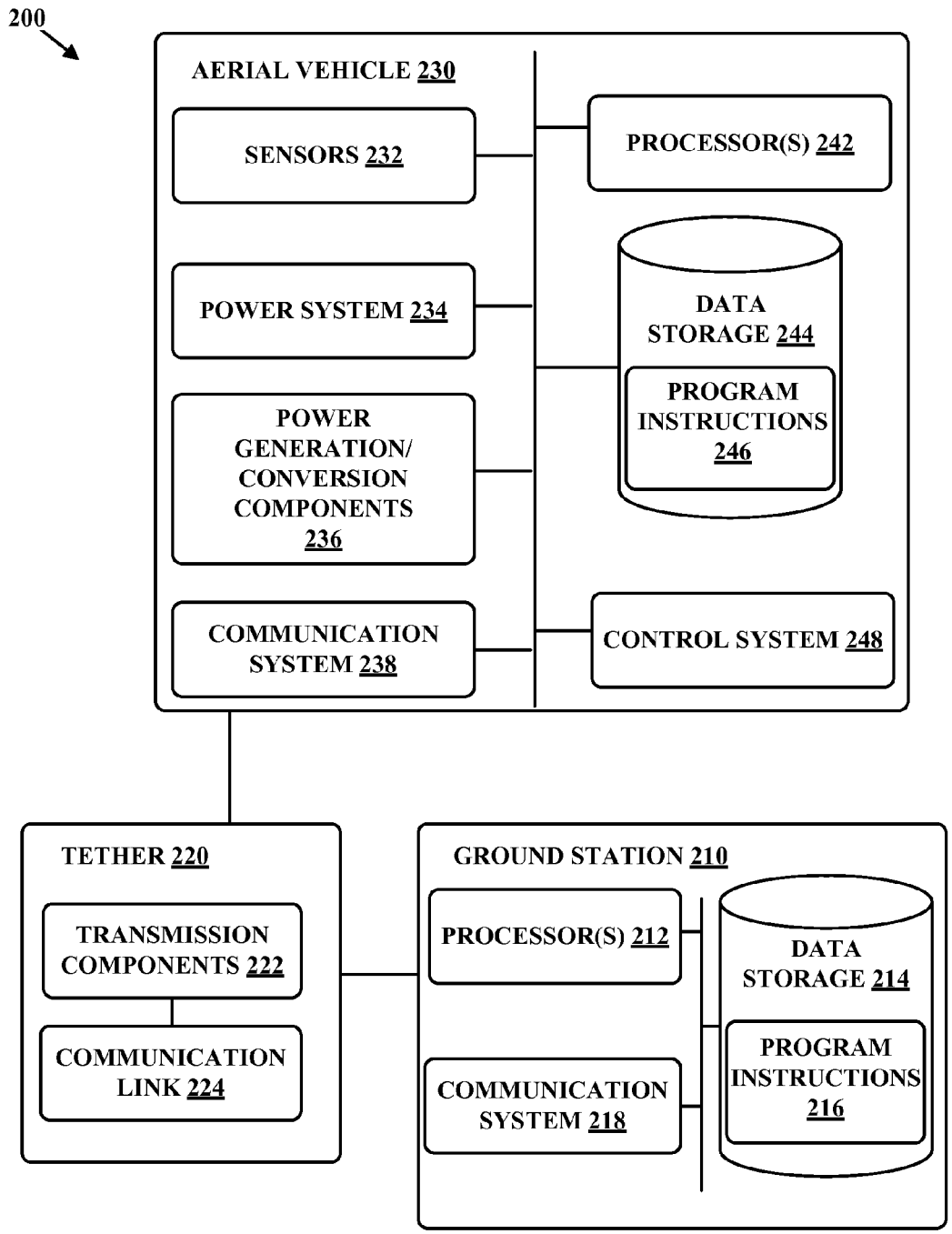
FIG. 2 is a block diagram illustrating components of a tethered aerial vehicle system, in accordance with at least some embodiments described herein.

FIG. 2 is a block diagram illustrating components of a tethered aerial vehicle system 200, in accordance with at least some embodiments described herein. The functions, operation, and structure of the system 200 may be similar to the system 100. For example, the system 200 includes a ground station 210, a tether 220, and an aerial vehicle 230 that are similar, respectively, to the ground station 110, the tether 120, and the aerial vehicle 130 described in the system 100 of FIG. 1.

As shown in FIG. 2, the ground station 210 may include one or more processors 212, data storage 214, and program instructions 216. The processors 212 may include a general-purpose processor or a special purpose processor (e.g., digital signal processors, application specific integrated circuits, etc.). The one or more processors 212 may be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication system 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations, etc.) and one or more data networks, such as cellular network and/or the Internet. Configured as such, the ground station 210 may facilitate data communications that the remote support device would otherwise be unable to perform by itself, for example.

For example, the ground station 210 may provide a WiFi connection to the remote device, and serve as a proxy or gateway to a cellular service provider's data network, which the ground station 210 might connect to under an LTE or a 3G protocol, for instance. In some examples, the ground station 210 may also serve as a proxy or gateway to other ground stations or a command station, which the remote device might not be able to otherwise access.

Moreover, as shown in FIG. 2, the tether 220 may include transmission components 222 and a communication link 224. In some examples, the transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some examples, the transmission components 222 may surround a core of the tether 220 (not shown in FIG. 2).

In some examples, the ground station 210 may communicate with the aerial vehicle 230 via the communication link 224. For example, the communication link 224 may be bidirectional and may include one or more wired and/or wireless interfaces. Additionally, in some examples, the communication link 224 may include one or more routers, switches, and/or other devices or networks.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the system 200 to provide various functions described herein.

As another example, the sensors 232 may include one or more wind sensors, such as one or more pitot tubes. The one or more wind sensors may be configured to detect apparent and/or relative wind. Such wind data may be utilized by the system 200 to provide various functions described herein.

In some examples, the sensors 232 may include load cells configured to measure a tether force between the tether 220 and the aerial vehicle 230. For example, magnitude and direction of the apparent and/or relative wind may be estimated by the system 200 based on utilizing the tether force in an aerodynamic force equation as described herein. Additionally or alternatively, in some examples, the sensors 232 may comprise a strain gauge configured to measure a given force between a component of the aerial vehicle 230 (e.g., pylons, tail boom, tail wing, etc.) and the aerial vehicle 230. For example, the given force may be utilized similarly to the tether force by the system 200 to estimate the magnitude and direction of the apparent and/or relative wind.

Still as another example, the sensors 232 may include an inertial measurement unit (IMU). The IMU may include both an accelerometer and a gyroscope, which may be used together to determine the orientation of the aerial vehicle 230. In particular, the accelerometer may measure the orientation of the aerial vehicle 230 with respect to earth, while the gyroscope may measure the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 may take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D of the system 100 in FIG. 1. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself, for example.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 may also serve as a proxy or gateway to other aerial vehicles or a command station, which the remote device might not be able to otherwise access, for example.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. In some examples, the control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

Figure 3A:
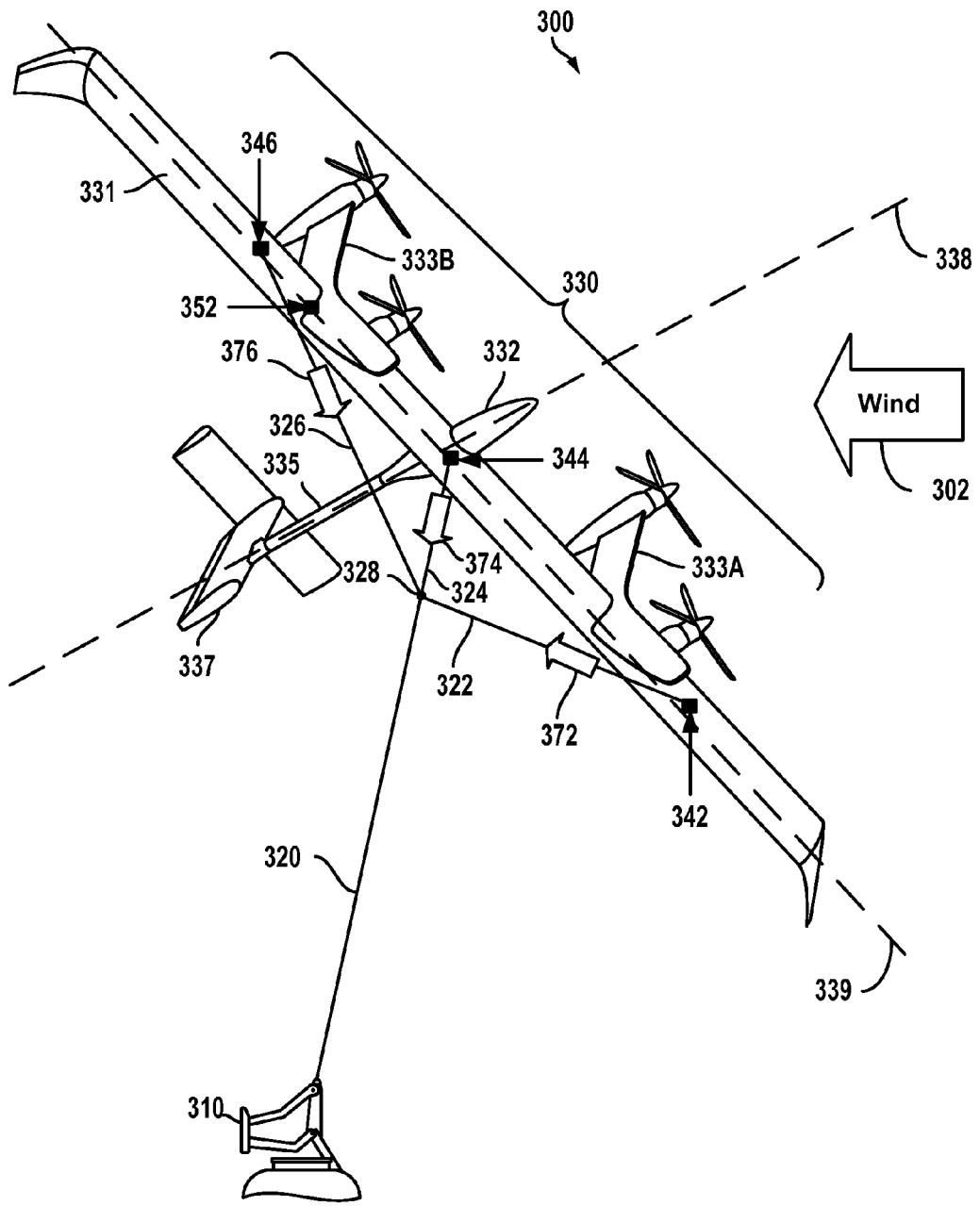
FIG. 3A illustrates another example system that includes a tethered aerial vehicle, in accordance with at least some embodiments described herein.

FIG. 3A illustrates another example system 300 that includes a tethered aerial vehicle 330, in accordance with at least some embodiments described herein. The functions, operation, and structure of the system 300 may be similar to the systems 100 and 200. For example, the system 300 includes a ground station 310, a tether 320, bridles 322-326, attachment point 328, and an aerial vehicle 330 that are similar, respectively, to the ground station 110, the tether 120, the bridles 122-126, the attachment point 128, and the aerial vehicle 130 described in the system 100 of FIG. 1. Additionally, for example, the aerial vehicle 330 includes a main wing 331, a front section 332, pylons 333A-B, a tail boom 335, and a vertical stabilizer 337 similar, respectively to the main wing 131, the front section 132, the pylons 133A-B, the tail boom 135, the tail wing 136, and the vertical stabilizer 137 described in the system 100 in FIG. 1.

In some examples, FIG. 3A may illustrate the operation of the system 300 during flight of the aerial vehicle 330, with wind 302 incident on the aerial vehicle 330. In some examples, the wind 302 may be referred to as the aerodynamics term of "relative wind." It is noted that a direction of the wind 302 as illustrated in FIG. 3A may be different than the actual direction of the wind 302 during flight of the aerial vehicle 330. For example, the direction of the wind 302 may depend on various factors such as atmospheric turbulence or flight path of the aerial vehicle 330.

The system 300 includes load cells 342-346 that are coupled to the tether 320 via the bridles 322-326 and configured to provide information indicative of a tether force between the tether 320 and the aerial vehicle 330. For example, the load cells 342-346 may include a transducer configured to convert bridle forces 372-37, between, respectively, the bridles 322-326 and the main wing 331 into electrical signals that indicate the bridle forces 372-376. In some examples, the bridle forces 372-376 may be combined to determine the tether force between the tether 320 and the aerial vehicle 330. For example, a sum of vector representations of the bridle forces 372-376 may correspond to a vector representation of the tether force. The load cells 342-346 may include hydraulic load cells, pneumatic load cells, strain gauge load cells, piezoelectric load cells, or any other sensor configured to measure force.

In some examples, the load cells 342-346 may be arranged in a given arrangement indicative of a direction of the tether force. For example, as illustrated in FIG. 3A, the bridle force 372 measured by the load cell 342 has a direction from the load cell 342 to the attachment point 328 as indicated by the arrow of the bridle force 372 in FIG. 3A. Similarly, for example, the bridle forces 374-376 have directions, respectively, from the load cells 344-346 to the attachment point 328. As discussed earlier, in some examples, the direction of the tether force may correspond to a vector sum of the bridle forces 372-376. Thus, for example, the given arrangement of the load cells 342-346 may be indicative of the direction of the tether force.

Although not illustrated in FIG. 3A, the load cells 342-346 may be arranged in other arrangements such as along the bridles 322-326, at the attachment point 328, along the tether 320, or between the ground station 310 and the tether 320. Although illustrated in FIG. 3A that load cells 342-346 are three load cells, in some examples, the load cells 342-346 may include more or less load cells.

The system 300 also includes a strain gauge 352 configured to provide data indicative of a side force on the aerial vehicle 330 that is substantially perpendicular to the flight path of the aerial vehicle 330. In some examples, the strain gauge 352 may be configured as a planar resistor that deforms, stretches, or contracts due to the side force (e.g., due to wind 302 incident on the aerial vehicle 330). In these examples, a resistance of the strain gauge 352 may be measured in the system 300 to indicate a magnitude of the given force to facilitate determination of the side force. For example, as illustrated in FIG. 3A, the strain gauge 352 may be arranged between the pylon 333B and the main wing 331. In this arrangement, for example, the strain gauge may measure the given force between the main wing 331 and the pylon 333B due to the wind 302 incident on the pylon 333B. In this example, the side force (e.g., sideslip) may be determined based on the given force. Although illustrated in FIG. 3A that the strain gauge 352 is arranged between the pylon 333B and the main wing 331, in some examples, the strain gauge 352 may be arranged in other locations along a side of the aerial vehicle 330 to provide the data indicative of the side force. For example, the strain gauge 352 may be configured to measure the given force between the pylon 333A and the main wing 331 or between the tail boom 335 and the tail wing 337.

As illustrated in FIG. 3A, the aerial vehicle 330 may have a longitudinal axis 338 (e.g., roll axis, etc.). Additionally, as illustrated in FIG. 3A, the aerial vehicle 330 may have a lateral axis 339 (e.g., pitch axis, spanwise axis, etc.). For example, as illustrated in FIG. 3A, the first axis 338 may be a centerline axis of the aerial vehicle 330 along the tail boom 335 pointing out of the front section 332, and the second axis 339 may be along the main wing 331.

In some examples, the system 300 may include a controller similar to the processors 212 and/or 242 in the system 200 of FIG. 2. In these examples, the controller may determine the tether force and/or the side force as described above based on the information from the load cells 342-346 and the strain gauge 352. Further, in some examples, the controller may be configured to operate the system 300 to cause the aerial vehicle 330 to fly along a given path similarly to the path 150 described in the system 100 of FIG. 1. To facilitate the operation of the aerial vehicle 330 by the controller, in some examples, the controller may control various aerodynamic parameters of the aerial vehicle 330 such as angle-of-attack (alpha) and sideslip angle (beta).

Figure 3B:
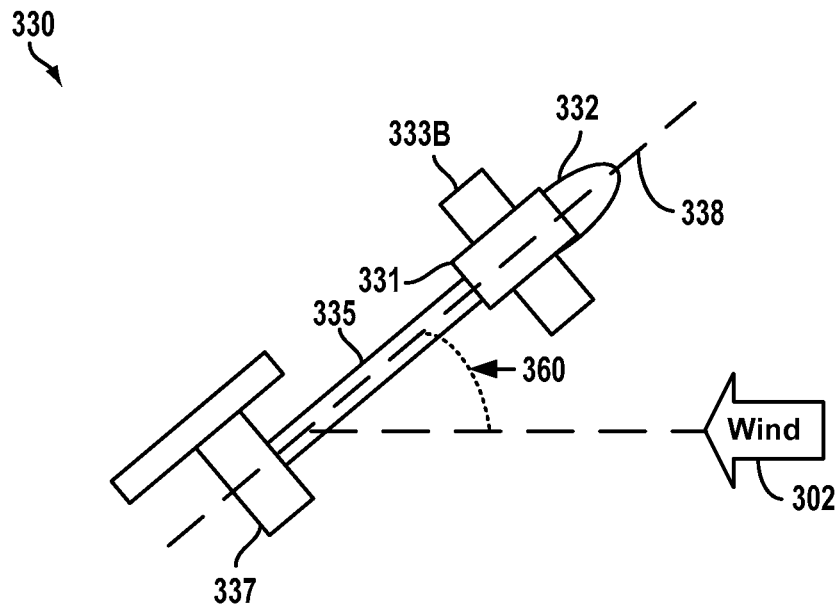
FIG. 3B illustrates a side view of the aerial vehicle in FIG. 3A, in accordance with at least some embodiments described herein.

FIG. 3B illustrates a side view of the aerial vehicle 330 in FIG. 3A, in accordance with at least some embodiments described herein. The "side view" illustrated in FIG. 3A corresponds to a view of the aerial vehicle 330 with the lateral axis 339 pointing out of the page. In some examples, the angle alpha (e.g., angle-of-attack) described above may be defined as a first angle 360 between the direction of the wind 302 (e.g., apparent wind, relative wind, etc.) incident on the aerial vehicle 330 and a plane that includes the longitudinal axis 338 and the lateral axis 339 as illustrated in FIG. 3B.

Figure 3C:
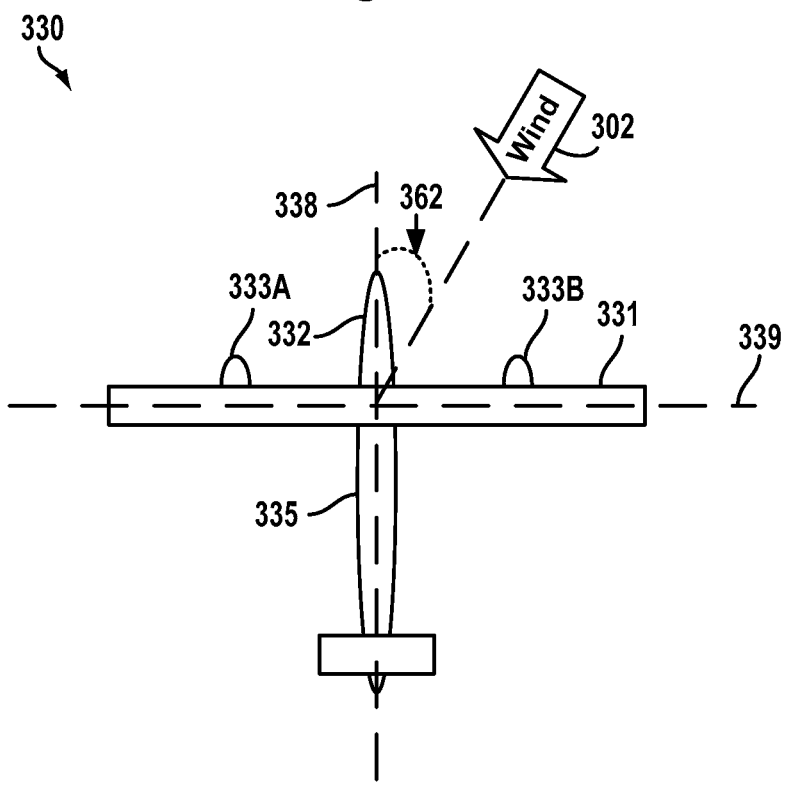
FIG. 3C illustrates a top view of the aerial vehicle in FIG. 3A, in accordance with at least some embodiments described herein.

FIG. 3C illustrates a top view of the aerial vehicle in FIG. 3A, in accordance with at least some embodiments described herein. The "top view" illustrated in FIG. 3C corresponds to a view of the aerial vehicle 330 with a side of the aerial vehicle 330 that is opposite to the side that includes the load cells 342-346 pointing out of the page. In FIG. 3C, for example, the plane that includes the longitudinal axis 338 and the lateral axis 339 may correspond to the surface of the page. Additionally, for example, the direction of the wind 302 as illustrated in FIG. 3C may correspond to a projection of a vector representation of the wind 302 on the plane that includes the longitudinal axis 338 and the lateral axis 339. In some examples, the angle beta (e.g., sideslip angle) described above may be defined as a second angle 362 (e.g., along the plane defined by the longitudinal axis 338 and the lateral axis 339) between the longitudinal axis 338 and the direction of the wind 302. In some examples, the second angle 362 (e.g., sideslip angle) may be described as a directional angle-of-attack that corresponds to the second angle 362 between the longitudinal axis 338 and a side force acting on the aerial vehicle 330 due to the wind 302.

Regulating the first angle 360 and/or the second angle 362 as described above by the controller may allow the aerial vehicle 330 to fly along the given path. For example, the controller may actuate control surfaces (e.g., winglets, flaps, main wing 331, tail wing 337, etc.) to regulate the aerodynamic parameters (e.g., first angle 360, second angle 362, etc.) to cause the aerial vehicle 330 to fly along the given path. Additionally, in some examples, the controller may control the aerial vehicle 330 based on the aerodynamic parameters described above to avoid stalling the aerial vehicle 330 during flight.

Additionally, in some examples, the controller may be configured to cause the aerial vehicle 330 to fly at a given orientation relative to the wind 302 based on operation of at least one control surface (e.g., main wing 331, tail wing 337, etc.) of the aerial vehicle 330 to cause an adjustment of the first angle 360 and/or the second angle 362. For example, the system 300 may be configured as an Airborne Wind Turbine (AWT) configured to provide electrical energy based on a lift force on the aerial vehicle 330 due to the wind 302. In this example, a magnitude of the lift force may be based on the angle-of-attack (e.g., the first angle 360) of the aerial vehicle 330 relative to the wind 302. For example, a high angle-of-attack may correspond to a high lift force that causes a high electrical energy production by the AWT. However, in some examples, the high angle-of-attack may cause the aerial vehicle 330 to stall. Thus, the controller in this example may determine an optimum angle at which a high lift force of the aerial vehicle 330 is attained to efficiently produce electrical energy by the AWT without stalling the aerial vehicle 330. Further, in this example, the controller may cause the aircraft to fly at the given orientation in response to determining the first angle 360 to cause the adjustment to the first angle 360 to correspond to the optimum angle described above. Similarly, in some examples, the controller may be configured to cause an adjustment to the second angle 362 to correspond to the given orientation.

In some examples, the controller may be configured to determine the aerodynamics parameters described above (e.g., first angle 360, second angle 362, etc.) based on the tether force and/or the side force determined, as described above, from the information provided by the load cells 342-346 and/or the strain gauge 352.

A general expression for the aerodynamic force vector $\vec{F}_{aero}$ acting on the aerial vehicle 330 may be described as:

$$\vec{F}_{aero} = \frac{1}{2}\rho_{air}v_{app}^2\vec{C}_F(\alpha, \beta, \vec{\omega})A, \quad [1]$$

where $\rho_{air}$ is the density of air, $v_{app}$ is the apparent wind speed at the aerial vehicle 330 (e.g., airspeed), $\vec{C}_F(\alpha,\beta,\vec{\omega})$ is a vector of force coefficients representing all aerodynamic forces as a function of angle-of-attack ($\alpha$), sideslip angle ($\beta$), angular velocity of the aerial vehicle 330 ($\vec{\omega}$), and A is a reference area of the aerial vehicle 330 (e.g., area of the main wing 331). In some examples, the vector of force coefficients $\vec{C}_F(\alpha,\beta,\vec{\omega})$ may also be a function of additional variables such as a Reynolds number and/or a Mach number of the aerial vehicle 330.

In some examples, the angular velocity ($\vec{\omega}$) may be measured by an inertial measurement unit (IMU) sensor. Additionally, in some examples, the function $\vec{C}_F(\alpha,\beta,\vec{\omega})$ may be estimated from computational aerodynamic models of the aerial vehicle 330, wind tunnel tests, and/or flight data. In one example, $\vec{v}_{app}$ may be measured by a pitot tube sensor. Alternatively, in another example, $\vec{v}_{app}$ may be estimated from the main wing 331 inertial velocity $\vec{v}_{wing}$ and local wind velocity $\vec{v}_{wind}$ as shown below:

$$\vec{v}_{app} = \vec{v}_{wind} - \vec{v}_{wing}, \quad [2]$$

The wing inertial velocity $v_{wing}$ may be estimated by a variety of sensors such as GPS, tether angle measurement unit, radar, lidar, computer vision, IMU, etc. The local wind velocity $\vec{v}_{wind}$ may be estimated by various devices such as a wind sensor in the ground station 310, lidar wind measurements, solar wind measurements, etc.

Further, the aerodynamic force vector $\vec{F}_{aero}$ may be estimated by the controller based on the tether force and/or the side force described above as shown in equation [3] below:

$$m\vec{a}_{IMU} = \vec{F}_{aero} + \vec{F}_{tether}, \quad [3]$$

where m is the mass of the aerial vehicle 330, $\vec{a}_{IMU}$ is the acceleration measured by the IMU, and $\vec{F}_{tether}$ is the tether force obtained from the information provided by the load cells 342-346 as described earlier.

With the aerodynamic force $\vec{F}_{aero}$ determined in equation [3] using the tether force $\vec{F}_{tether}$, equation [1] may be solved to determine the value of the function $\vec{C}_F(\alpha,\beta,\vec{\omega})$. Further, for example, the controller may determine the angle-of-attack α (e.g., the first angle 360) and the sideslip angle β (e.g., the second angle 362) by solving the functional form of the function $\vec{C}_F(\alpha,\beta,\vec{\omega})$ using the determined value.

In some examples, roll and pitch angles of the tether 320 may be small. In these examples, a magnitude of the lift force L acting on the aerial vehicle 330 during flight may be estimated to correspond to the tether force $\vec{F}_{tether}$. Further, in these examples, the angle-of-attack α may be similarly determined using the equation below:

$$L = \frac{1}{2}\rho_{air}v_{app}^2\vec{C}_L(\alpha)A, \qquad [4]$$

where $\vec{C}_L$ (a) is a vector of force coefficients representing the lift force as a function of angle-of-attack (α), and can be estimated similarly to $\vec{C}_F(\alpha,\beta,\vec{\omega})$ using computational aerodynamic models of the aerial vehicle 330, wind tunnel tests, and/or flight data.

As illustrated in the examples above, the controller in the system 300 may determine the aerodynamic parameters corresponding to the first angle 360 and the second angle 362 (e.g., α,β) based on the information from the load cells 342-346 and/or the strain gauge 352. Alternatively, in some examples, the aerodynamic parameters may be measured using other sensors such as pitot tubes or vanes. However, for example, pitot tubes and vanes may be less reliable and/or more expensive than the load cells 342-346 and the strain gauge 352. For example, pitot tubes and vanes may be prone to clogging by rain, bugs, dust, and/or other environmental factors in the environment of the aerial vehicle 330 unlike the load cells 342-346.

Figure 4:
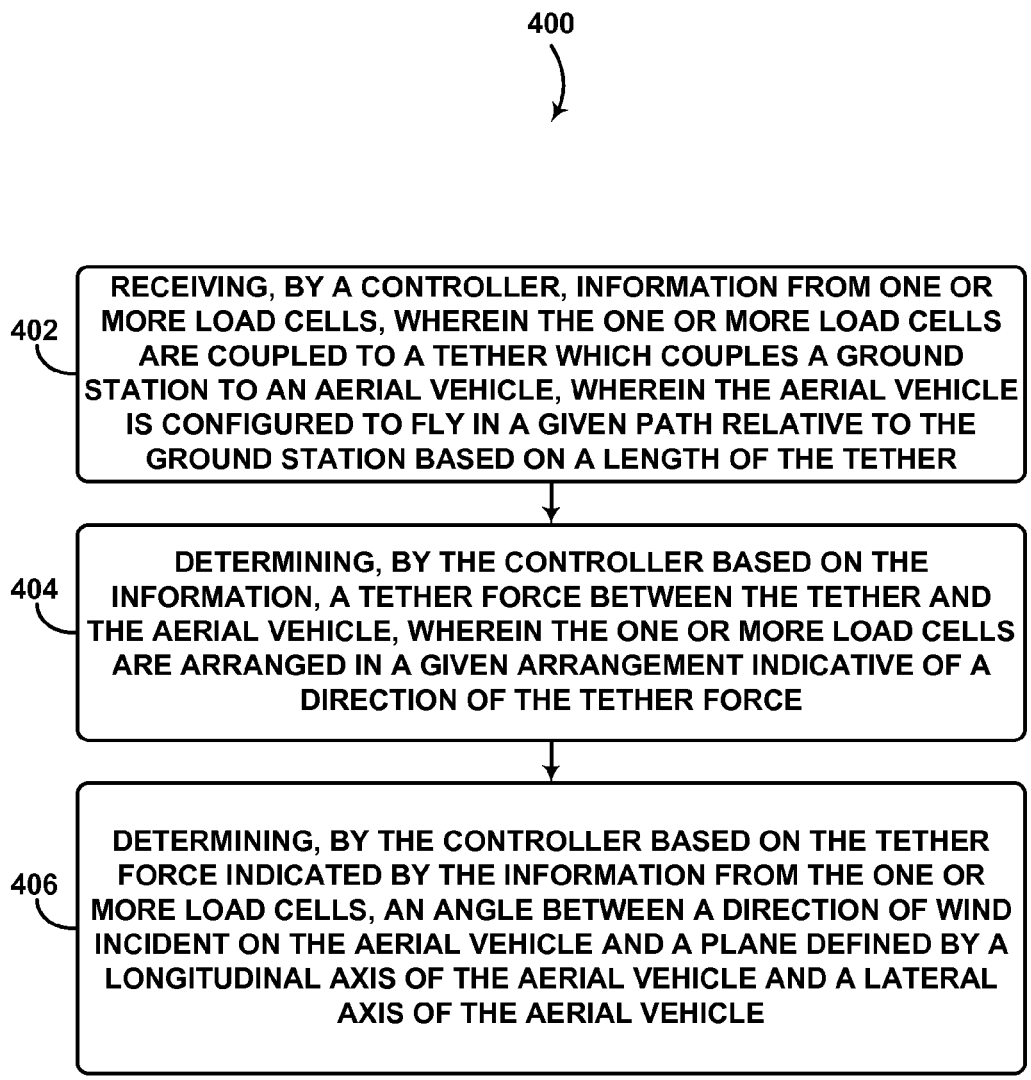
FIG. 4 illustrates an example method, in accordance with at least some embodiments described herein.

FIG. 4 illustrates an example method 400, in accordance with at least some embodiments described herein. Method 400 shown in FIG. 4 presents an embodiment of a method that could be used with the systems 100-300, for example. Method 400 may include one or more operations, functions, or actions as illustrated by one or more of blocks 402-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

At block 402, the method 400 includes receiving, by a controller, information from one or more load cells. The one or more load cells may be coupled to a tether which couples a ground station to an aerial vehicle. The aerial vehicle may be configured to fly in a given path relative to the ground station based on a length of the tether. Referring back to the example of FIG. 3A, the aerial vehicle may be similar to the aerial vehicle 330 and the one or more load cells may be similar to the load cells 342-346.

At block 404, the method 400 includes determining a tether force between the tether and the aerial vehicle by the controller based on the information. The one or more load cells may be arranged in a given arrangement indicative of a direction of the tether force. Referring back to the example of FIG. 3A, the one or more load cells may be arranged between a plurality of bridles (e.g., bridles 322-326) and the aerial vehicle in the given arrangement (e.g., co-linear or non-linear arrangement) such that the direction of the tether force is indicated by the given arrangement. For example, in FIG. 3A, the bridle force 372 between the bridle 322 and the load cell 342 has a direction from a location of the load cell 342 to the attachment point 328. Further, in this example, a vector sum of the bridle forces 372-376 may indicate the direction of the tether force.

At block 406, the method 400 includes determining an angle between a direction of wind incident on the aerial vehicle and a plane defined by a longitudinal axis of the aerial vehicle and a lateral axis of the aerial vehicle by the controller based on the tether force indicated by the information from the one or more load cells. For example, the angle (e.g., angle-of-attack) may be determined by the controller solving an equation such as equation [1] and/or [4] in the description of FIGS. 3A-3C.

In some examples, the controller may also cause the aerial vehicle to fly at a given orientation relative to the wind based on operation of at least one control surface of the aerial vehicle to cause an adjustment of the angle as described in the system 300 of FIGS. 3A-3C.

Figure 5:
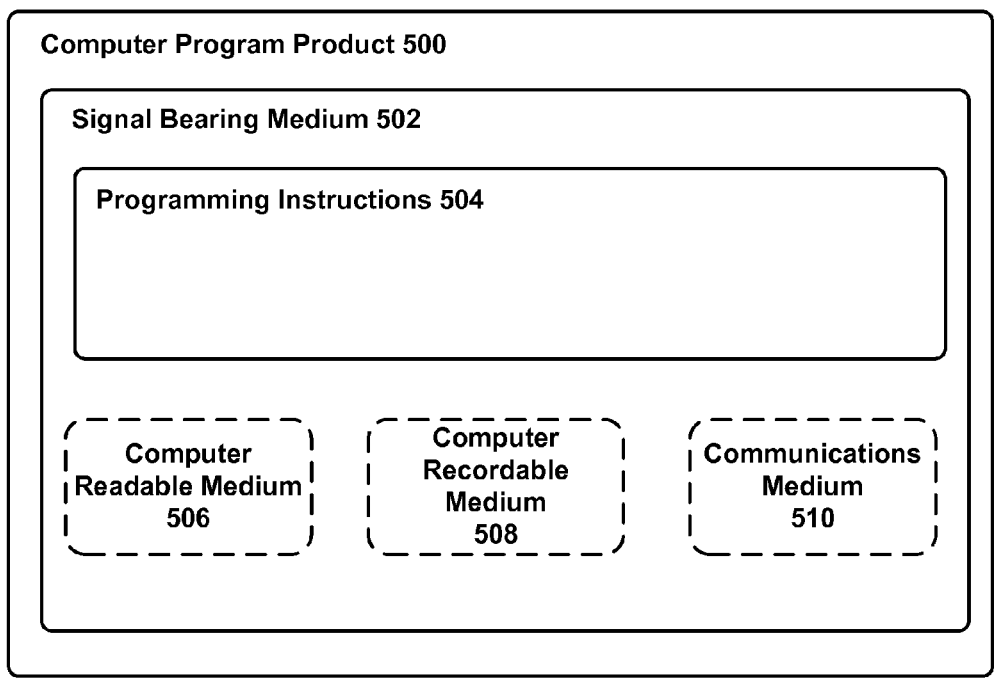
FIG. 5 depicts an example computer readable medium configured according to at least some embodiments described herein.

FIG. 5 depicts an example computer-readable medium configured according to at least some embodiments described herein. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. method 400) may be implemented by computer program instructions encoded on a computer readable storage media in a machine-readable format, or on other media or articles of manufacture (e.g., the program instructions 216 and/or 246 of the system 200). FIG. 5 is a schematic illustrating a conceptual partial view of an example computer program product that includes a computer program for executing a computer process on a computing device, arranged according to at least some embodiments disclosed herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may be a computer-readable medium 506, such as, but not limited to, a hard disk drive, a Compact Disc (CD), a Digital Video Disk (DVD), a digital tape, memory, etc. In some implementations, the signal bearing medium 502 may be a computer recordable medium 508, such as, but not limited to, memory, read/write (R/W) CDs, R/W DVDs, etc. In some implementations, the signal bearing medium 502 may be a communication medium 510 (e.g., a fiber optic cable, a waveguide, a wired communications link, etc.). Thus, for example, the signal bearing medium 502 may be conveyed by a wireless form of the communications medium 510.

The one or more programming instructions 504 may be, for example, computer executable and/or logic implemented instructions. In some examples, a computing device may be configured to provide various operations, functions, or actions in response to the programming instructions 504 conveyed to the computing device by one or more of the computer readable medium 506, the computer recordable medium 508, and/or the communications medium 510.

The computer readable medium 506 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system comprising:
    a tether coupled to a ground station;
    an aerial vehicle coupled to the tether and configured to fly in a given path relative to the ground station based on a length of the tether;
    one or more load cells coupled to the tether to provide information indicative of a tether force between the tether and the aerial vehicle, wherein the one or more load cells are arranged in a given arrangement indicative of a direction of the tether force; and
    a controller determining an acceleration of the aerial vehicle flying in the given path, and
    the controller determining, based on the determined acceleration and the tether force indicated by the information from the one or more load cells, an orientation of the aerial vehicle relative to a direction of wind incident on the aerial vehicle.

2. The system of claim 1, wherein determining the orientation comprises determining an angle-of-attack of the aerial vehicle, and wherein the controller operates the aerial vehicle to cause an adjustment of the angle-of-attack in accordance with a given angle-of-attack.

3. The system of claim 1, wherein determining the orientation comprises determining a sideslip angle of the aerial vehicle, and wherein the controller operates the aerial vehicle to cause an adjustment of the sideslip angle in accordance with a given sideslip angle.

4. The system of claim 1, further comprising:
    a plurality of bridles configured to couple the tether with the aerial vehicle, wherein the one or more load cells are coupled to the plurality of bridles and configured to provide data indicative of bridle forces between the plurality of bridles and the aerial vehicle, wherein the controller is configured to determine the tether force based on the bridle forces.

5. The system of claim 1, further comprising:
    a strain gauge coupled to the aerial vehicle to provide data indicative of a side force on the aerial vehicle that is substantially perpendicular to the given path of the aerial vehicle, wherein determining the orientation comprises determining a sideslip angle of the aerial vehicle based on the side force, and wherein the controller operates the aerial vehicle to cause an adjustment of the sideslip angle in accordance with a given sideslip angle.

6. The system of claim 5, wherein the strain gauge is arranged along a tail boom of the aerial vehicle to measure a given force on the tail boom due to the wind, and wherein the controller determines the side force based on the given force.

7. The system of claim 5, wherein the strain gauge is arranged between the aerial vehicle and a pylon of the aerial vehicle to measure a given force between the aerial vehicle and the pylon due to the wind, and wherein the controller determines the side force based on the given force.

8. A method comprising:
    receiving, by a controller, information from one or more load cells, wherein the one or more load cells are coupled to a tether which couples a ground station to an aerial vehicle, and wherein the aerial vehicle is configured to fly in a given path relative to the ground station based on a length of the tether;
    determining, by the controller based on the information, a tether force between the tether and the aerial vehicle, wherein the one or more load cells are arranged in a given arrangement indicative of a direction of the tether force;
    determining, by the controller, an acceleration of the aerial vehicle flying in the given path; and
    determining, by the controller based on the determined acceleration and the tether force indicated by the information from the one or more load cells, an orientation of the aerial vehicle relative to a direction of wind incident on the aerial vehicle.

9. The method of claim 8, further comprising:
    determining an angle-of-attack of the aerial vehicle, wherein determining the orientation comprises determining the angle-of-attack; and
    causing, by the controller, the aerial vehicle to adjust the angle-of-attack in accordance with a given angle-of-attack.

10. The method of claim 8, further comprising:
- determining, by the controller based on the tether force, a sideslip angle of the aerial vehicle, wherein determining the orientation comprises determining the sideslip angle; and
- causing, by the controller, the aerial vehicle to adjust the sideslip angle in accordance with a given sideslip angle.

11. The method of claim 8, further comprising:
- determining, by the controller, bridle forces between the aerial vehicle and a plurality of bridles configured to couple the tether with the aerial vehicle, wherein the one or more load cells are coupled to the plurality of bridles and configured to provide data indicative of the bridle forces, wherein determining the tether force is based on the bridle forces.

12. The method of claim 8, further comprising:
- determining, by the controller based on a strain gauge coupled to the aerial vehicle, a side force on the aerial vehicle that is substantially perpendicular to the given path of the aerial vehicle;
- determining, by the controller based on the side force, a sideslip angle of the aerial vehicle, wherein determining the orientation comprises determining the sideslip angle; and
- causing, by the controller, the aerial vehicle to adjust the sideslip angle in accordance with a given sideslip angle.

13. The method of claim 12, wherein the strain gauge is arranged along a tail boom of the aerial vehicle to measure a given force on the tail boom of the aerial vehicle due to the wind, wherein determining the side force is based on the given force.

14. The method of claim 12, wherein the strain gauge is arranged between the aerial vehicle and a pylon of the aerial vehicle to measure a given force between the aerial vehicle and the pylon due to the wind, wherein determining the side force is based on the given force.

15. A non-transitory computer readable medium having stored therein instructions, that when executed by a computing device, cause the computing device to perform functions, the functions comprising:
- receiving information from one or more load cells, wherein the one or more load cells are coupled to a tether which couples a ground station to an aerial vehicle, and wherein the aerial vehicle is configured to fly in a given path relative to the ground station based on a length of the tether;
- determining, based on the information, a tether force between the tether and the aerial vehicle, wherein the one or more load cells are arranged in a given arrangement indicative of a direction of the tether force;
- determining an acceleration of the aerial vehicle flying in the given path; and
- determining, by the controller based on the determined acceleration and the tether force indicated by the information from the one or more load cells, an orientation of the aerial vehicle relative to a direction of wind incident on the aerial vehicle.

16. The non-transitory computer readable medium of claim 15, the functions further comprising:
- determining an angle-of-attack of the aerial vehicle, wherein determining the orientation comprises determining the angle-of-attack; and
- causing, responsive to determining the angle-of-attack, the aerial vehicle to adjust the angle-of-attack in accordance with a given angle-of-attack.

17. The non-transitory computer readable medium of claim 15, the functions further comprising:
- determining a sideslip angle of the aerial vehicle, wherein determining the orientation comprises determining the sideslip angle; and
- causing the aerial vehicle to adjust the sideslip angle in accordance with a given sideslip angle.

18. The non-transitory computer readable medium of claim 15, the functions further comprising:
- determining bridle forces between the aerial vehicle and a plurality of bridles configured to couple the tether with the aerial vehicle, wherein the one or more load cells are coupled to the plurality of bridles and configured to provide data indicative of the bridle forces, wherein determining the tether force is based on the bridle forces.

19. The non-transitory computer readable medium of claim 15, the functions further comprising:
- determining, based on a strain gauge coupled to the aerial vehicle, a side force on the aerial vehicle that is substantially perpendicular to the given path of the aerial vehicle;
- determining, based on the side force, a sideslip angle of the aerial vehicle, wherein determining the orientation comprises determining the sideslip angle; and
- causing the aerial vehicle to adjust the sideslip angle in accordance with a given sideslip angle.

20. The non-transitory computer readable medium of claim 19, wherein the strain gauge is arranged along a tail boom of the aerial vehicle to measure a given force on the tail boom due to the wind, and wherein determining the side force is based on the given force.

* * * * *